United States Patent [19]
Johnson et al.

[11] Patent Number: 5,854,779
[45] Date of Patent: Dec. 29, 1998

[54] OPTICAL DISC READER FOR READING MULTIPLE LEVELS OF PITS ON AN OPTICAL DISC

[75] Inventors: Bruce V. Johnson, Berkeley; Gregory A. McDermott, San Francisco; Michael P. O'Neill, Richmond; Cezary Pietrzyk, Pinole; Steven Spielman, Berkeley; Terrence L. Wong, San Francisco, all of Calif.

[73] Assignee: Calimetrics, Alameda, Calif.

[21] Appl. No.: 583,651

[22] Filed: Jan. 5, 1996

[51] Int. Cl.⁶ .................................................... G11B 7/00
[52] U.S. Cl. ................................................ 369/59; 369/54
[58] Field of Search ................................ 369/59, 48, 124, 369/54, 109

[56] References Cited

U.S. PATENT DOCUMENTS

| | | |
|---|---|---|
| 3,901,597 | 8/1975 | White . |
| 4,689,491 | 8/1987 | Lindow et al. . |
| 4,890,275 | 12/1989 | Mori .......................................... 369/59 |
| 5,029,023 | 7/1991 | Bearden et al. . |
| 5,235,587 | 8/1993 | Bearden et al. . |
| 5,260,562 | 11/1993 | Bearden et al. . |
| 5,408,456 | 4/1995 | Hosoya . |
| 5,453,969 | 9/1995 | Psaltis et al. . |
| 5,566,158 | 10/1996 | Kobayashi et al. ...................... 369/59 |
| 5,617,390 | 4/1997 | Iijima et al. .............................. 369/59 |

FOREIGN PATENT DOCUMENTS

| | | |
|---|---|---|
| 0709837A2 | 5/1996 | European Pat. Off. . |
| 63-32746 | 2/1988 | Japan . |
| 63-146224A | 6/1988 | Japan . |
| 01159832A | 6/1989 | Japan . |
| 03-141031 | 6/1991 | Japan . |
| 03-141032 | 6/1991 | Japan . |
| 03237622A | 10/1991 | Japan . |
| 04209320A | 7/1992 | Japan . |
| 2122408 | 1/1984 | United Kingdom . |

OTHER PUBLICATIONS

Marx, David S. and Psaltis, "Pit Depth Encoded Memories," OSA (Optical Society of America) Optical Data Storage Meeting, May 17, 1994, Dana Point California, published in Porceedings of the SPIE –The International Society for Optical Engineering, 1994, vol. 2338:65–8.

D.S. Marx, D. Psaltis and G. Sirat, "Pit depth encoded memories," *OSA (Optical Society of America) Optical Data Storage Meeting*, May 17, 1994, Dana Point, California, published in Proceedings of the SPIE –The International Society for Optical Engineering, 1994, vol. 2338:65–8.

*Primary Examiner*—Thang V. Tran
*Attorney, Agent, or Firm*—Ritter, Van Pelt & Yi LLP

[57] ABSTRACT

The present invention is a system for reading a CD having a surface with a multiple level data track including a laser, a focusing and positioning system configured in a way which causes the laser to follow the multiple level data track, a detector which converts the light which is reflected from the data track to an electrical signal, a digital signal processing unit configured to receive the electrical signal including a scaling-function generator for determining a plurality of signal windows from the electrical signal, and a multiple level analog to digital converter which determines a data level based on the signal windows and the electrical signal whereby multiple data levels may be read from the CD.

6 Claims, 5 Drawing Sheets

OPTICAL DISC READER FOR READING MULTIPLE LEVELS OF PITS ON AN OPTICAL DISC

BACKGROUND OF THE INVENTION

The present invention relates generally to an apparatus and method for providing high capacity and fast transfer speed compact disc (CD) data storage.

The compact disc (CD) has become the standard for high-speed, high-capacity Read Only Memory (ROM). In addition, there are also recordable (CD-R) and rewritable (CD-E) CD technologies available. Advances in CD technology have increased both the speed of data transfer and the amount of data which a single CD can hold. Progress has been made in data transfer speed by spinning the disc faster during read and by more densely packing data in a two-dimensional space. Packing data more densely has also resulted in increased data storage capacity.

Current methods of optical data storage encode information on the surface of a CD using pits of constant depth but varying length alternating with lands of varying length. A detailed description of this method may be found in the Compact Disc Handbook, by Ken C. Pohlmann A-R Editions, Inc. Madison, Wis. 1992, which is incorporated here by reference. The lengths of the pits and lands encode the data. The laser that reads the data is focused on an area of the disc surface which is characterized by a pit or a land. If the laser is focused on a pit, then the difference in the optical path length of the light reflected from the bottom of a pit from the optical path length of the light reflected from the surrounding surface of the CD causes an interference effect and the intensity of the light reflected from the disc is decreased. The intensity of the light reflected from the disc therefore produces a signal in a detector which corresponds to a pit or a land. Each edge or transition from pit to land or from land to pit is detected and recognized as a logical 1 (one). The length of pit or land between edges represents a series of logical 0's (zeroes). The number of zeroes in the series is proportional to the length of the region between edges.

The CD is typically created from a metal stamper that bears an inverse pattern of the data-encoding pits and lands. A Material such as molten polycarbonate is injected into a mold containing the stamper to produce the CD. After removal of the cooled polycarbonate disc, the data-bearing side of the disc is typically coated with a thin layer of aluminum to increase the reflectivity of the surface. The aluminum is usually coated by a protective layer of lacquer. The data on the disc is read by focusing a laser beam through the polycarbonate side of the disc onto a spiral track that contains the pits and lands of varying length. As the disc rotates through the focus of the laser beam, electromechanical servo systems keep the laser beam on track and in focus.

Another method is also used to effect a change in reflectivity at the desired location of a pit on the surface of a disc. Instead of creating a physical pit in the surface of the disc, the index of refraction of the disc material in the region of the desired pit location is varied from the index of refraction of the disc material in a land region. This may be done, for example, by providing at least one layer of the disc which is made from a material that can change its crystalline properties and therefore its index of refraction upon heating, a so-called phase-change material. The change in the index of refraction in the material in a region changes the reflectivity in that region. Upon exposure to a heat source, typically a focused laser beam, the material can be made to encode data in the form of varying lengths of high-reflectivity regions alternating with varying length regions of low-reflectivity. This method is similar in concept to the aforementioned pit/land method with regard to encoding a logical 1 (one) in the form of the edges, and logical 0's (zeroes) in the form of the space between the edges.

In general, the invention described in the detailed description of the preferred embodiment may be used with a disc manufactured to have variable depth pits, a disc manufactured with "pits" consisting of a variable index of refraction material, a disc manufactured with "pits" that produce in any other way a variable optical path length between the laser and disc surface, or a disc manufactured with "pits" consisting of a variable reflectivity disc surface.

In the pit/land case, the index of refraction of the disc does not change; rather a pit of carefully selected dimensions is used to modulate the amount of light that is reflected back to the light-sensitive detector. The reading laser, when focused on a pit, is such that a portion (approximately half) of the focused light falls in the pit while the other portion falls outside on the surrounding land region. The depth of the pit is approximately one quarter of the reading laser wavelength so that upon reflection, a total of a half-wavelength shift between the two portions of the beam results in one portion being out of phase with the other. This results in destructive interference between the two portions of the querying light beam and hence little light-intensity is measured by the light-sensitive detector when a pit is encountered. Thus, edges or transitions from pit to land are easily detectable as transitions in light intensity between two states: bright and dark (note that it is desirable to provide some light intensity even in the presence of a pit so as to allow the focus and tracking servos to remain operational).

Faster data transfer as well as higher information storage capacity could be achieved if, instead of merely detecting the edges or transitions between two states, pit and land, a detector could be developed which could resolve multiple levels of encoded data at each point on the disc. Such a detector could distinguish between more than the two disc surface levels, pit and land. If n different levels of pits are distinguished, then log2 (n) bits of information could be stored in the area of a minimum-length pit. Various numbers of pit levels (n) could be used. For example, 8 different levels would encode 3 bits, 16 different levels would encode 4 bits, 32 different levels would encode 5 bits, and so on; values of n that are not powers of two would encode a fractional number of bits, e.g., 9 different levels would encode 3.17 bits per pit. To further increase the information capacity of the CD, rather than following a variable-depth pit by a land region, another variable-depth pit could immediately follow the preceding one, and so on, such that each variable-depth pit immediately abuts each adjacent variable-depth pit. Furthermore, additional information capacity could be achieved by not restricting the variable-depth pits to n discrete levels, but by allowing them to be encoded and read in a continuous, or analog, fashion. Throughout this specification, detecting more than two signal levels from pits with more than two levels will be referred to as detecting "multiple" levels from "multiple" level pits.

One method of detecting multiple level pits is the laser-feedback method of depth detection as described in U.S. Pat. Nos. 5,029,023; 5,235,587; and 5,260,562 issued to Bearden and O'Neill. In the laser feedback method, the laser itself acts as a phase detector for the reflected light from the disc. A portion of the reflected light from the disc reenters the laser cavity, causing the intensity of the laser output to vary as a function of the optical path length of the reflected light.

Since the optical path length of the reflected light is affected by the depth of the pit which reflected it, it is possible to precisely measure changes in pit depth. Changes in pit depth are determined from the laser's intensity, not from the intensity of the reflected light from the disc as with current CD technology or as described in the present invention.

A disadvantage of the laser feedback interferometer method is that the laser intensity modulation is affected by the absolute distance between the laser and the reflective surface of the disc. Variations in the flatness of the disc, as well as wobble caused by spinning of the disc, therefore cause modulation of the laser intensity.

It would be advantageous if, instead of detecting only two levels of depth, i.e. pit or land, a system could be provided which could detect more than two depth levels. It would also be desirable if such a system's output was not sensitive to the absolute distance between the reading laser and the disc surface.

SUMMARY OF THE INVENTION

Accordingly, the present invention reads more information from the same amount of CD surface area by, instead of merely detecting edge transitions between pits and lands, providing a CD reader which can detect multiple levels of pits. The interference between the portion of the beam that lies within the pit and the portion of the beam that lies outside of the pit on the surrounding surface of the CD results in changing the light intensity back-reflected from the disc as monitored by a light-sensitive detector.

The present invention relates to a method and apparatus for reading multiple levels of intensity of light reflected from a CD with variable depth pits, with an index of refraction modulated material, or with any material that modulates the optical path length of the reflected light or alters the reflectivity of the CD surface in any other way.

The present invention includes an apparatus and method for reading a CD having a surface with a multiple level data track including a laser, a focusing and positioning system configured in a way which causes the laser to follow the multiple level data track, a detector which converts the light which is reflected from the data track to an electrical signal, a digital signal processing unit configured to receive the electrical signal including a scaling-function generator for determining a plurality of signal windows from the electrical signal, and a multiple level analog to digital converter which determines a data level based on the signal windows and the electrical signal whereby multiple data levels may be read from the CD.

The present invention further includes an apparatus and method for reading a CD having a surface with a continuously variable data track including a laser, a focusing and positioning system configured in a way which causes the laser to follow the variable level data track, a detector which converts the light which is reflected from the data track to an electrical signal, and an analog signal processing unit configured to receive the electrical signal, whereby an analog data signal may be read from the CD.

Additional objects and advantages of the invention will be set forth in part in the description which follows, and will in part become apparent to those skilled in the art upon examination of the following, or may be learned by practice of the invention. The objects and advantages of the invention may be realized and obtained by means of the instrumentalities and combinations particularly pointed out in the claims.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DESCRIPTION OF THE PREFERRED EMBODIMENT

Reference will now be made in detail to the preferred embodiment of the invention, which is a system and method for reading multiple levels of variable intensity light produced by a CD which is encoded with multiple level pits. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims.

Figure 1:
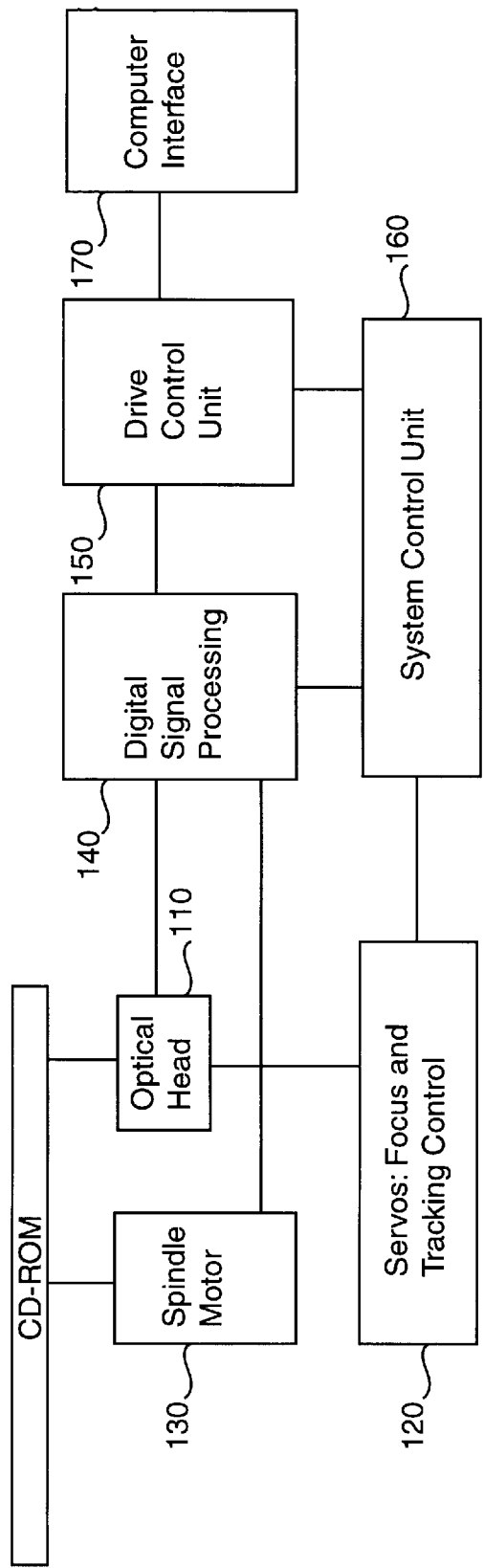
FIG. 1 shows the basic functional blocks of a prior art CD reader.

The constituents of the variable depth optical disc reader, which is capable of detecting and interpreting the multi-level variable-intensity signal produced by multiple level pits and their surrounding lands, are similar to those of a conventional CD-ROM player. FIG. 1 shows the basic functional blocks of a conventional prior art CD reader: optical head 110, servos 120, spindle motor 130, digital signal processing unit 140, drive control unit 150, system control unit 160, and computer interface 170. The optical head 110 contains opto-mechanical components to produce a laser beam, focus the beam on the disc, maintain the focus of the beam on a track of data, and read the data stored on the disc.

Figure 2A:
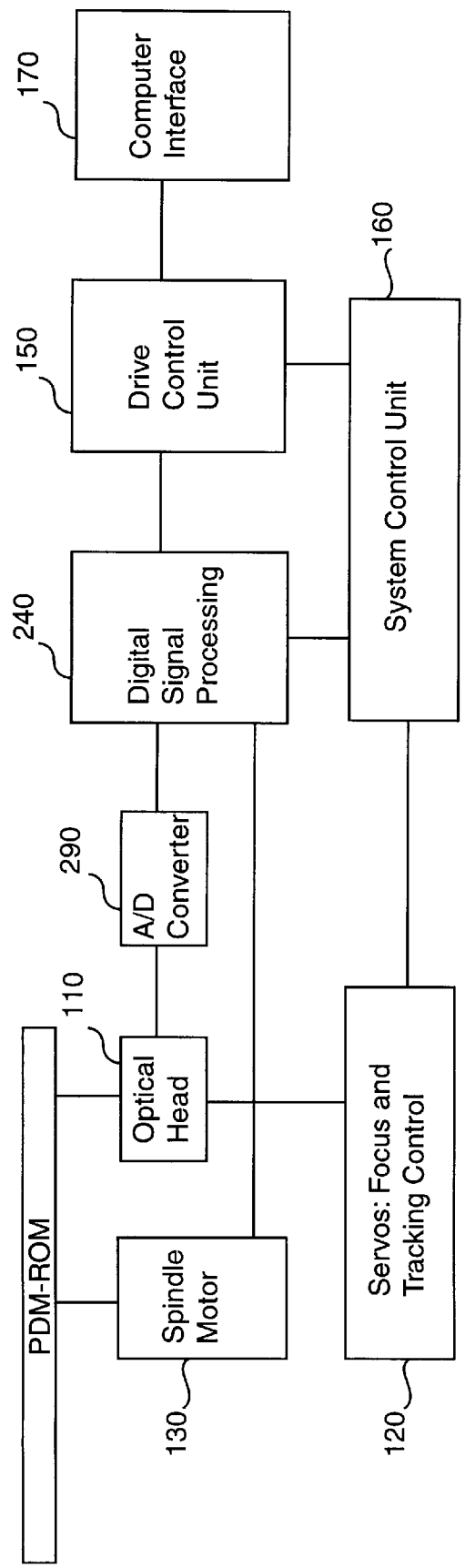
FIG. 2 shows the basic constituents of a variable-depth optical disc reader.

FIG. 2A shows the basic constituents of a digital variable-depth optical disc reader. The multiple signal levels from the optical head 110 are converted from analog to digital by an analog-to-digital (A/D) converter 290. The A/D conversion can be performed by feeding the multiple level voltage simultaneously to the inputs of n comparators, each of which are also connected to n equally spaced reference voltages, thus forming a "ladder". Each comparator with an input voltage greater than its reference voltage returns a high output signal, or is "activated"; otherwise a low signal output is obtained. The digital output of the ladder corresponds to the highest "rung" activated. The digital output is then sent to a digital signal processor (DSP) 240.

Figure 2B:
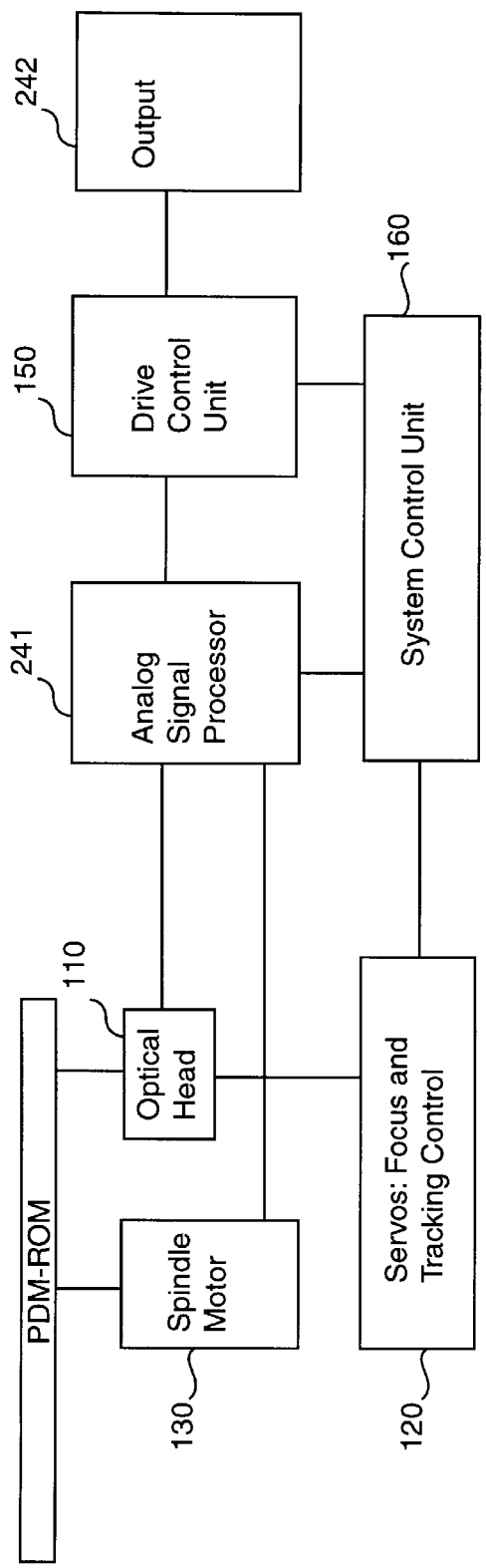

If the signal is encoded in an analog fashion, the analog signal does not have to be converted to a digital signal; the signal can be simply used in an analog fashion as, for example, by a radio or television. Such an analog system is shown in FIG. 2b, where an analog signal processor 241, processes the signal from optical head 110 and transfers the signal to output 242.

The variable-intensity signal produced by variable-depth pits and their surrounding lands is measured by a light-sensitive detector in the optical head 110. This detector converts the variable-intensity light signal into a variable-amplitude electrical signal, which represents the data. The electrical signal is used to keep the optical head in focus and on track as well as to read the data.

Figure 3:
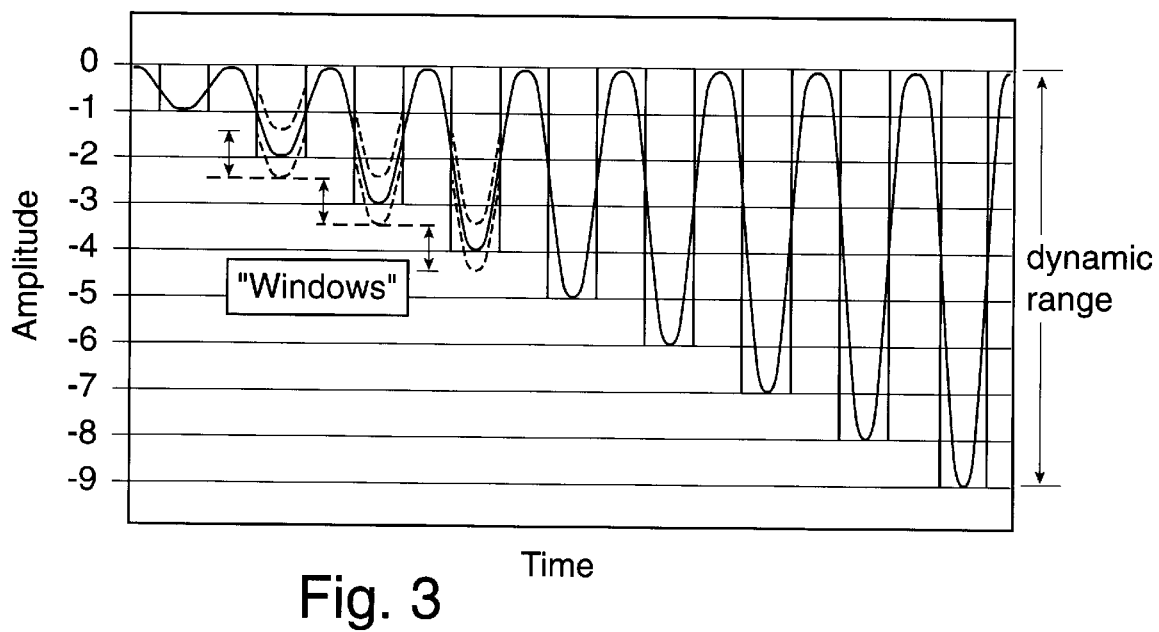
FIG. 3 shows an idealized light-sensitive detector output in response to a return-to-zero (RTZ) variable pit-depth pattern illustrating dynamic range and windows.

The depth of the pit can be determined from the variable-amplitude signal and where it falls within its full, or dynamic range. The dynamic range is the full range over which the signal can vary: from its lowest value (for the deepest pit) to its highest value (for the shallowest pit or no pit). As shown in FIG. 3, this range can be broken into a number of windows 300. FIG. 3 shows the output 310 of a detector which has sequentially detected nine different level pits 320, with a land located between each pit 320. As the depth of each pit 320 increases, the intensity of the detector output 310 decreases. The detector output 310 returns to its maximum value between each pit 320.

Figure 4:
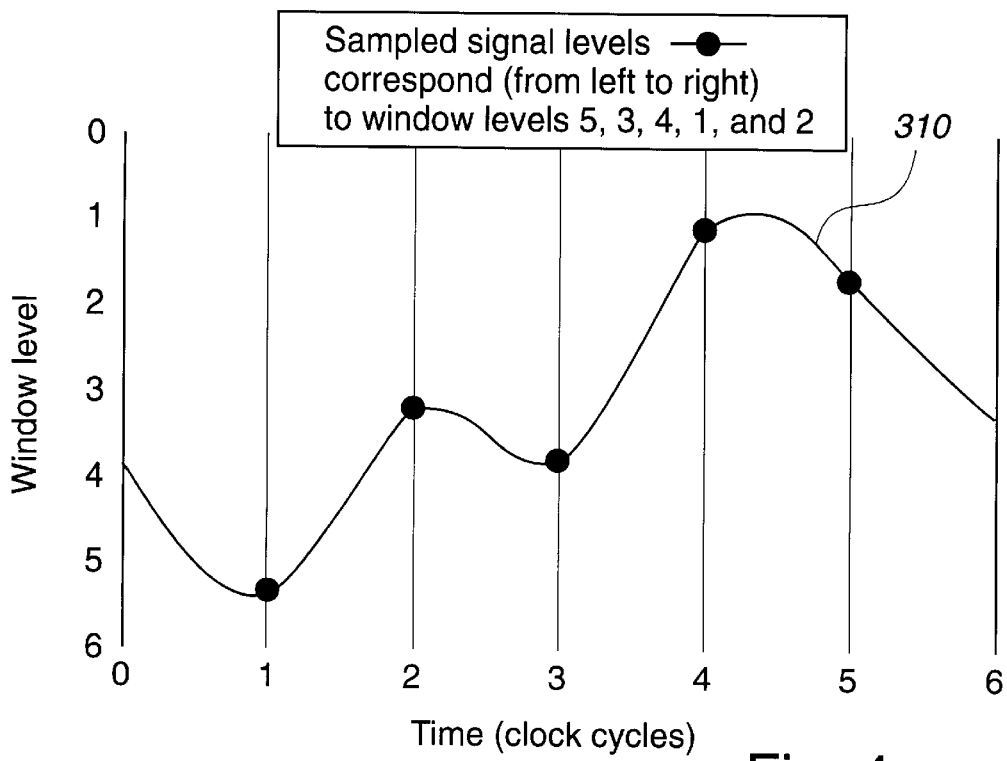
FIG. 4 illustrates the windowing decision process.

Nine different pit levels are illustrated in FIG. 3. Since the variable-amplitude signal varies between a value of −9 for the deepest pit and 0 for no pit, the range can be conveniently divided into ten windows. When the variable-amplitude-signal falls within a given window, the pit is determined to be the depth associated with that window. For example, any signal between −2.5 and −3.5 would be assigned to pit depth 3; any signal between −3.5 and −4.5 would be assigned to the next-deepest pit, pit depth 4, and so forth. Referring to FIG. 4, signal 310 would sampled at times 1, 2, 3, 4, and 5 and would be converted into levels 5, 3, 4, 1 and 2, respectively.

Further, it is not necessary that the full dynamic range, or the windows within it, remain fixed during the reading of a disc. It would be possible, by using a set of calibration pits, to adjust the full dynamic range and the windows as the disc is being read. For instance, the calibration pits could cover the full possible range of pit depths. Let us say these pits are read as signal values of 0, −0.9, −1.8, −2.7, −3.6, −4.5, −5.4, −6.3, −7.2, and −8.1. This information can be used to compress the range and windows. For this example, the window for pit depth 3 would now be centered about the signal value of −2.7 and extend from −2.25 to −3.15. This allows the reader to adapt to variations due to its own optical, mechanical, and electrical performance as well as variations in the disc caused by variations in the stamper or by other factors present in the replication process.

Figure 5:
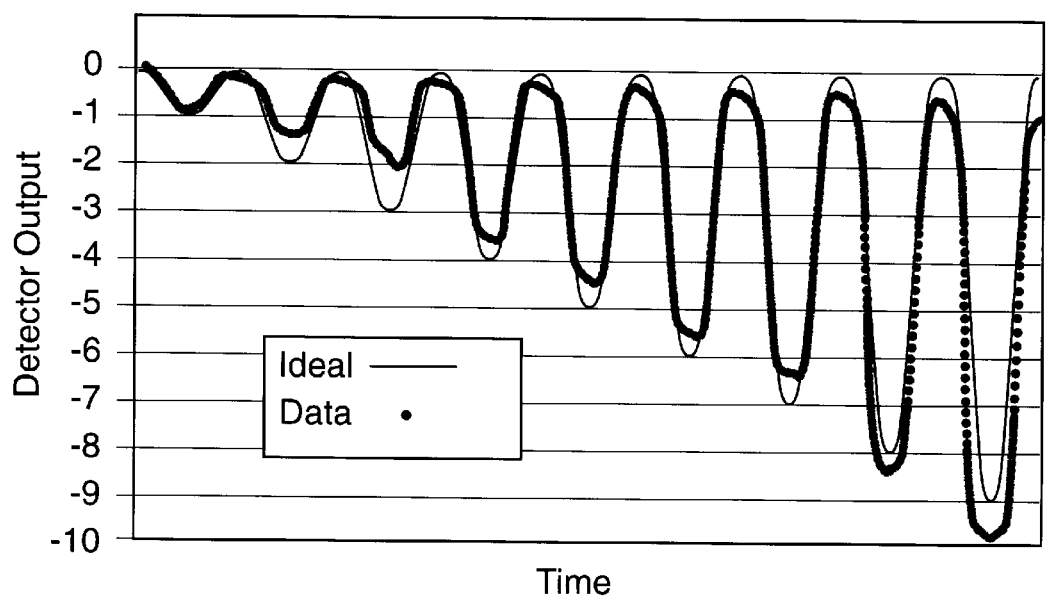
FIG. 5 shows a comparison of an idealized and actual light-sensitive detector output in response to a RTZ variable pit-depth pattern.

FIG. 3 depicts a linear relationship between the pit depths and the detector output which represents the intensity of the reflected light. In practice, variations and some nonlinearity in the system (for example, in writing the master, in replication, or in reading) may occur as shown in the actual data depicted in FIG. 5. Nonlinearity in the relationship between pit depth and signal intensity may be compensated for during disc production by slightly altering the pit depth corresponding to each signal level to compensate for an expected nonlinearity. Alternatively, system nonlinearity could be compensated for by using data from the calibration pits to adjust the decision-level windows in the reader. Other processing techniques for adjusting the signal output will be apparent to one skilled in the art of signal measurement and processing.

Some variation in the signal level associated with a specific pit level may occur as a result of intersymbol interference. Intersymbol interference is caused by the interference of light reflected from the pit being read with light reflected from pits located adjacent to the pit which is being read. It is possible to pre-compensate for this effect during mastering by varying a pit's depth to account for signal contributions from the neighboring pits. Alternatively, it is possible to compensate for intersymbol interference by adjusting the Digital to Analog Converter parameters or conditioning the analog or digital signal to compensate for the variation in intensity caused by intersymbol interference.

Also, in a similar manner to the above calibration of the amplitude-windows for the signal, a sampling clock that determines when the variable signal is to be measured must be appropriately synchronized to the pit pattern on the disc. This synchronization of the sampling clock is accomplished using a timing-synchronization pit pattern that allows the disc reader's system to determine whether the sampling clock needs to be sped up or slowed down. It would also be possible to use the same set of pits for both synchronization and calibration.

After the signal has been assigned to different pit-depth levels, the signal can be decoded so that the originally stored data is recovered. The decoding process typically, but not necessarily, includes removing channel coding, checking and correcting for errors, and de-interleaving the data. Intersymbol interference may also be compensated for in this step. These functions are usually performed by the digital signal processor 240. The channel coding is designed to take full advantage of the abilities of the storage system. In the case of current CD-ROM, an 8-bit word is channel encoded into a series of 1's and 0's that meets the following criteria: there are at least two and no more than ten 0's between each 1. Since on a current CD-ROM the 1's are physically encoded on the disc by a transition from pit to no-pit or a transition from no-pit to pit, the above criteria ensure that the transitions neither occur too close together nor too far apart in order to stay within the limitations of the system. In the case of variable-depth optical discs, the channel encoding also will ensure that the physically encoded data can be clearly read by the player. For example, the sequence of levels written on the disc could require that no two adjacent pits have the same depth. On the disc, there is also information designed to locate and correct errors. This information along with the interleaving of data, the spreading of a data block over a larger area of the disc by breaking up the block and interleaving it with other similarly segmented blocks, guarantees that the data read from the disc is a true representation of the original data.

The drive control unit 150 is involved with locating and retrieving the desired data from the disc. The system control unit 160 manages the communication between all of the electronic units of the disc reader. And last, the computer interface 170 manages the communication between the variable-depth optical disc reader and the computer.

In summary, a method and apparatus for reading multiple levels of intensity of light reflected from a CD has been described.

The foregoing description of the preferred embodiment of the invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention and various embodiments, and with various modifications as are suited to the particular use contemplated. It is intended that the scope of the invention be defined only by the appended claims.

What is claimed is:

1. A method of reading data from an optical information storage disc having an information storage track that includes a plurality of pits, each pit having the capacity to store at least three discrete data levels represented by the depth of the pit comprising:

reading the information storage track and outputting an analog data signal indicative of the depth of the pits;

sampling the analog data signal in the vicinity of the location of a pit;

converting the analog data signal to a digital data signal which is indicative of the depth of the pit at the location of the sampled pit and which includes a plurality of bits for each sample;

determining the discrete data level stored at the location of the sampled pit from the digital data signal, there being the potential of at least three discrete data levels, wherein each data level corresponds to an associated range of digital signal values, wherein determining the discrete data level stored at the location of the sampled pit includes dynamically calibrating the ranges of digital signal values, wherein the dynamic calibration includes determining a signal range corresponding to each of the potential data levels from reading a calibration pattern on the disc wherein the calibration pattern includes a calibration pit corresponding to each discrete data level so that each discrete data level has a corresponding calibration pit in the calibration pattern used to determine the signal range corresponding to each of the discrete data levels;

whereby the discrete data level read from each pit has the capacity to represent more than one bit of information.

2. A method as recited in claim 1 wherein the calibration pattern includes information indicative of a potential number of discrete data levels that the pits may include, the method further comprising the step of identifying the number of discrete data levels and determining the signal ranges accordingly.

3. A method as recited in claim 1 further comprising the step of dynamically calibrating the information storage disc, wherein the dynamic calibration includes determining windows having window boundaries which correspond to digital data levels.

4. A method for reading data from an optical information storage disc having an information storage track that includes a plurality of information storage locations, each information storage location having the capacity to store at least three discrete data levels comprising:

reading the information storage track and outputting an analog data signal indicative of the data level stored at the information storage locations;

sampling the analog data signal in the vicinity of the location of a selected one of the information storage locations;

converting the analog data signal to a digital data signal which is indicative of the data level stored at the selected information storage location and which includes a plurality of bits for each sample;

dynamically calibrating ranges of digital signal values, wherein the dynamic calibration includes:

reading a calibration pattern on the disc wherein the calibration pattern includes a plurality of calibration locations and wherein the calibration pattern includes a calibration location corresponding to each discrete data level so that each discrete data level has a corresponding calibration location in the calibration pattern which is used to determine the signal range corresponding to each of the discrete data levels and determining the signal range corresponding to each of the discrete data levels using the calibration pattern, wherein the calibrated signal ranges are used in determining the data level read from each information storage location; and determining the discrete data level stored at the selected information storage location from the digital data signal using the calibrated signal ranges, there being the potential of at least three discrete data levels, wherein each data level corresponds to one of the calibrated signal ranges;

whereby the discrete data level read from the selected information storage location has the capacity to represent more than one bit of information.

5. A method as recited in claim 4 wherein the calibration pattern includes information indicative of a potential number of discrete data levels that the information storage locations may include, the method further comprising the step of identifying the number of discrete data levels and determining the signal ranges accordingly.

6. A method as recited in claim 4 wherein dynamically calibrating ranges of digital signal values includes determining windows having window boundaries which correspond to the ranges of digital signal values.

* * * * *

UNITED STATES PATENT AND TRADEMARK OFFICE
CERTIFICATE OF CORRECTION

PATENT NO. : 5,854,779
DATED : December 29, 1998
INVENTOR(S) : JOHNSON et al.

It is certified that error appears in the above-identified patent and that said Letters Patent is hereby corrected as shown below:

Column 1, line 4 insert the following:

:, "This invention was made with United States Government support under cooperative agreement number 70NANB5H1087 awarded by NIST. The United States Government has certain rights in this invention."

Signed and Sealed this

Thirteenth Day of July, 1999

Attest:

Q. TODD DICKINSON

Attesting Officer

Acting Commissioner of Patents and Trademarks